(12) United States Patent
Bortnikov et al.

(10) Patent No.: US 9,979,734 B2
(45) Date of Patent: May 22, 2018

(54) MANAGEMENT OF TRANSACTIONS IN A DISTRIBUTED TRANSACTION SYSTEM

(71) Applicant: Yahoo Holdings, Inc., Sunnyvale, CA (US)

(72) Inventors: Edward Bortnikov, Haifa (IL); Ohad Shacham, Kfar Monash (IL); Idit Keidar, Haifa (IL); Eshcar Hillel, Haifa (IL); Sameer Paranjpye, Sunnyvale, CA (US)

(73) Assignee: Oath Inc., New York, NY (US)

( * ) Notice: Subject to any disclaimer, the term of this patent is extended or adjusted under 35 U.S.C. 154(b) by 169 days.

(21) Appl. No.: 14/691,310

(22) Filed: Apr. 20, 2015

(65) Prior Publication Data

US 2016/0308882 A1    Oct. 20, 2016

(51) Int. Cl.
*G06F 7/04*    (2006.01)
*H04L 29/06*    (2006.01)
*G06F 9/46*    (2006.01)
*G06F 17/30*    (2006.01)

(52) U.S. Cl.
CPC ............ *H04L 63/108* (2013.01); *G06F 9/466* (2013.01); *G06F 17/30353* (2013.01); *H04L 2463/121* (2013.01)

(58) Field of Classification Search
CPC ............ H04L 63/108; H04L 2436/121; G06F 17/30353; G06F 9/466
See application file for complete search history.

(56) References Cited

U.S. PATENT DOCUMENTS

| 8,504,542 | B2* | 8/2013 | Chang | G06F 17/30359 707/704 |
| 8,843,441 | B1* | 9/2014 | Rath | G06F 17/30578 707/614 |
| 2002/0010022 | A1* | 1/2002 | Vincent | G07F 17/32 463/42 |
| 2004/0260607 | A1* | 12/2004 | Robbins | G06Q 20/20 705/14.32 |
| 2007/0124342 | A1* | 5/2007 | Yamamoto | G06F 9/466 |
| 2011/0153566 | A1* | 6/2011 | Larson | G06F 17/30356 707/638 |
| 2012/0102006 | A1* | 4/2012 | Larson | G06F 17/30575 707/703 |
| 2012/0166407 | A1* | 6/2012 | Lee | G06F 17/30371 707/703 |
| 2015/0379060 | A1* | 12/2015 | Levandoski | G06F 17/30353 707/607 |

OTHER PUBLICATIONS

Peng, Daniel and Dabek, Frank, "Large-Scale Incremental Processing Using Distributed Transactions and Notifications", http://static.googleusercontent.com/media/research.google.com/en//pubs/archive/36726.pdf, retrieved Jan. 14, 2016.

* cited by examiner

*Primary Examiner* — Fatoumata Traore
*Assistant Examiner* — Khoi Le
(74) *Attorney, Agent, or Firm* — Weaver Austin Villeneuve & Sampson LLP

(57) ABSTRACT

Briefly, embodiments disclosed herein relate to managing transactions in a distributed content transaction system.

16 Claims, 8 Drawing Sheets

MANAGEMENT OF TRANSACTIONS IN A DISTRIBUTED TRANSACTION SYSTEM

BACKGROUND

Field

Subject matter disclosed herein relates to managing transactions in a distributed transaction system, such as a content transaction system.

Information

With networks, such as the Internet, gaining popularity, and with a vast multitude of content, such as pages, other electronic documents, other media content and/or applications (hereinafter 'digital content'), becoming available to users, such as via the World Wide Web (hereinafter 'Web'), it may be desirable to provide more efficient and/or more streamlined approaches to gather, organize, store, modify, and/or retrieve content, such as digital content, for example. Internet-type business entities, such as Yahoo!, for example, may provide a wide range of content storage and/or retrieval services for a wide range of applications, for example. Such content storage and/or retrieval services may involve distributed systems, particularly for large amounts of content to be accessed, stored, and/or modified, for example, by large numbers of clients.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
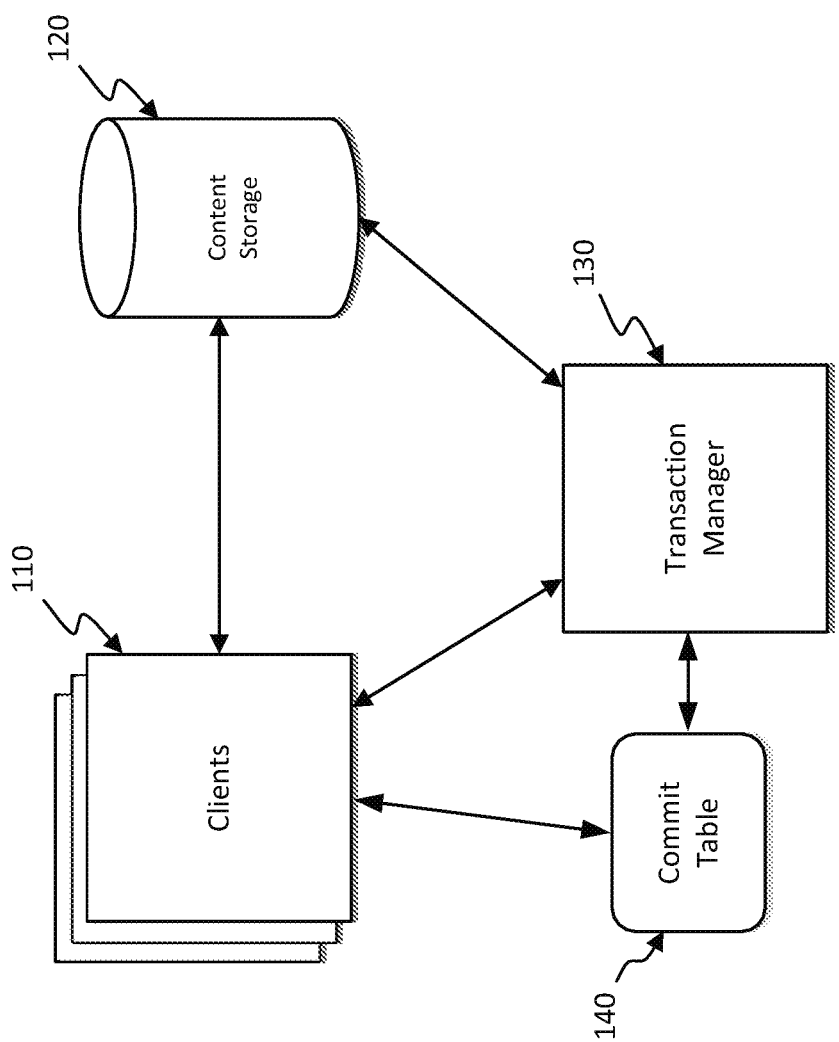
FIG. 1 is a schematic diagram illustrating an example transaction system, in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system comprises the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshaling distributed servers, running various tasks in parallel, and managing communications and signal transfers between various parts of the system, in an embodiment. As mentioned, one non-limiting, but well-known example comprises the Hadoop distributed computing system. It refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, executable by a computing device to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, for example, as may take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are substantially compatible and/or substantially compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically affects a single remote device.

A network may be very large, such as comprising thousands of nodes, millions of nodes, billions of nodes, or more, as examples. As mentioned, with networks, such as the Internet, gaining popularity, and with a vast multitude of content, such as pages, other electronic documents, other media content and/or applications (hereinafter 'digital content' or 'content'), becoming available to users, such as via the World Wide Web (hereinafter 'Web'), it may be desirable to provide more efficient and/or more streamlined approaches to gather, organize, store, modify, and/or retrieve content, such as digital content, for example, such as via a distributed system. Internet-type business entities, such as Yahoo!, for example, may provide a wide range of content storage and/or retrieval services for a wide range of applications, for example. Such content storage and/or retrieval services may involve a distributed system, particularly for large amounts of content that may be accessed, stored, and/or modified, for example, by large numbers of clients.

FIG. 1 is a schematic diagram illustrating an embodiment 100 of an example distributed transaction system. Example transaction system embodiment 100 may comprise one or more clients, such as clients 110, that may perform transactions, which may include content read and/or write operations, such as with respect to a database, such as content storage 120. In an embodiment, a client may comprise a client computing device including code executable by a computing device. In an embodiment, a computing device may execute one or more clients, for example. Further, in an embodiment, a database, such as content storage 120, may comprise content stored as signals and/or states in a memory of one or more computing devices. A database, such as content storage 120, may comprise a version of Apache HBase, for example, available for the Apache Software foundation; however, any database is suitable. Hbase is provided merely as an example; claimed subject matter is not limited in scope in this respect.

In an embodiment, a database, such as content storage 120, may employ an atomic transaction process with respect to an object stored as signals and/or states in a memory of one or more computing devices, for example. In this context, the term atomic transaction means a transaction is not to be executed partially. A transaction, which may comprise multiple operations, such as read and/or write operations, such as with respect to one or more objects, for example, is either fully executed or not executed at all. Likewise, the term object refers to an item logically stored as a separate or individual item within the database, independent of physical aspects with respect to storage, such as multiple memory locations, etc. Also, in an embodiment, content (e.g., objects) stored in a database, such as content storage 120, may comprise multi-versioned content objects. For example, in an embodiment, a client performing a write operation involving an object stored in content storage 120 may add a new version of the object rather than overwriting an older version of the object. An object within a database, such as content storage 120, may be associated with a key and/or an identifier, for example, as in a key-value pair, which may comprise a unique key or identifier in an embodiment. Thus, content storage 120, in an embodiment may be referred to as a "key-value store." However, claimed subject matter is not limited in scope in these respects.

In an embodiment, a transaction manager for a distributed transaction system, such as transaction manager 130, typically employs a set of transaction semantics that guide access with respect to content objects within a database, such as content storage 120. Thus, in this illustrative example, the distributed transaction system complies with the set of transaction semantics. In an embodiment, a transaction manager may comprise a computing device including code executable by a computing device, for example. In an embodiment, a computing device may execute one or more transaction managers, for example. In an embodiment, clients, such as one or more of clients 110, may access a database, such as content storage 120, directly, and/or may interact with a transaction manager, such as transaction manager 130, at a beginning of a sequence of operations comprising a transaction and/or at an end of a sequence of operations comprising a transaction, for example. Thus, the term "transaction" refers to a sequence of operations executed with respect to one or more objects, such as, for example, a sequence of read and/or write accesses to one or more content items stored in a database, such as content storage 120. Likewise consistent with the notion of atomic transactions, a given transaction may "commit" or it may "abort." if a transaction is committed, the results of executing the transaction is visible, such as to clients later accessing objects. If a transaction is aborted, then to clients later accessing objects, for example, it will appear as if the transaction was never attempted.

Further, in an embodiment, although transactions may be executed concurrently, the distributed system adheres to a specification of order with respect to committed transactions so that, for a given client accessing an object, for example, a consistent snapshot of a database, such as content storage 120, is visible to the given client. This order serves a variety of purposes including being employed in connection with determining whether to commit a given transaction. Thus, before a given transaction is to be committed, a transaction manager, for example, makes a determination that the operations of the given transaction do not conflict with other transactions being executed concurrently since the snapshot. Thus, the term "snapshot isolation" refers to the order for all committed transactions so that consistency, as discussed, is maintained.

To support snapshot isolation, a client for given transaction may obtain a snapshot timestamp at the beginning of the transaction. Also, in an embodiment, a transaction may be assigned a timestamp at a point in time on or after the transaction is committed, as explained in more detail below. In an embodiment, the latter timestamp, after assignment to a transaction, is used to determine order in a sequence of committed transactions. Likewise, the latter timestamp may in an embodiment comprise an incremented snapshot timestamp and comprise an identifier for the particular transaction.

As mentioned, in an embodiment, transactions comply with being atomic. That is, all write operations associated with a given transaction may be performed before the given transaction as a whole becomes committed. As mentioned previously, in an embodiment, a timestamp may be obtained from a transaction manager, such as transaction manager 130, in connection with a transaction being committed. A transaction may therefore in an embodiment be completed by writing the timestamp from the transaction manager to content objects updated as a result of write operations executed for that particular transaction. Thus, for a transaction, a content object, for example, may be written to twice—once to perform a tentative write operation, and again to write a timestamp, in an embodiment. A transaction may not be considered to be complete until a timestamp is written to all the content objects affected as a result of execution of the particular transaction, for example. As used herein, the term "tentatively written" and/or "tentative write" and/or the like refer to write operations executed with respect to content objects in a database, such as content storage 120, prior to the timestamp for the transaction to be committed is written to the affected content objects. That is, the write operations of a given transaction may be considered to be "tentative" up until all content objects in a database affected as a result of execution of the transaction have the timestamp for the transaction to be committed, in an embodiment.

The above approach for executing a transaction creates a window of time during which a transaction may be committed (a timestamp obtained), but where one or more writes to one or more respective objects may still be tentative. As an example, it is possible that a client, such as one or more of clients 110, may fail after committing to a transaction but before completing the transaction, for example. Thus, there may be no bound on the duration of the window between transaction commitment and transaction completion. A transaction, for example, that begins after a prior transaction has been committed, may have a snapshot timestamp larger than a timestamp for a transaction that previously was committed. A client performing the former transaction may therefore potentially encounter some tentatively-written content objects and other content objects associated with a prior committed transaction that are completed typically by another client (e.g., with the timestamp for the prior committed transaction).

In an embodiment, to help facilitate snapshot isolation and consistency, for example, a list of incomplete committed transactions may be tracked in a persistent portion of a shared memory. Here, this is referred to as a "commit table." In an embodiment, a commit table, such as commit table 140, may comprise signals and/or states representative of transaction commit status, transaction timestamps, and/or transaction identifiers stored in a memory of a computing device, for example.

In an embodiment, individual entries in a commit table, such as commit table 140, may map a committed transaction identifier to a timestamp for a transaction. A client performing a transaction that may encounter a tentative write during a read operation, for example, may refer to a commit table, such as commit table 140, to determine whether a transaction of another client that includes the tentative write has been committed, for example. In an embodiment, a client performing a transaction may encounter a committed transaction having an tentative write operation previously performed by another client, for example. A client encountering a committed transaction having a tentative write operation may help complete the transaction of the prior client by writing a timestamp to a tentatively-written object to show the transaction as complete.

In an embodiment, one or more elements of an example transaction management system, such as example distributed transaction system 100, may comprise a system compatible with an open-source project started by Yahoo!, Inc. referred to as "Omid." Omid is aimed at providing relatively low-overhead management of access to content stored in data stores, such as, for example, NoSQL data stores. Embodiments described herein may be implemented, at least in part, using one or more elements of an Omid-compatible system, although claimed subject matter is not limited in scope in this respect.

In an embodiment, an Omid-compatible system may comprise a distributed system that may include one or more servers and one or more clients. In an embodiment a server, including a transaction manager, may comprise a computing device including code executable by a computing device and/or stored content to manage transactions. Omid-compatible systems may provide lock-free transaction management, and/or may provide for transaction abort operations at commit time, for example. Also, for example, Omid-compatible systems may implement snapshot isolation. For example, in an Omid-compatible system, snapshot isolation may be governed and/or enforced by clients. For example, clients may ignore content objects not in their snapshot. Additionally, clients may communicate directly with a data store, and may only need to communicate with a transaction manager at the beginning of a transaction and/or at commit time. Conflicts among clients and/or transactions may be resolved by a transaction manager, in an embodiment. Of course, as mentioned, claimed subject matter is not limited in scope to utilization of one or more elements of Omid-compatible distributed content transaction systems.

Figure 2:
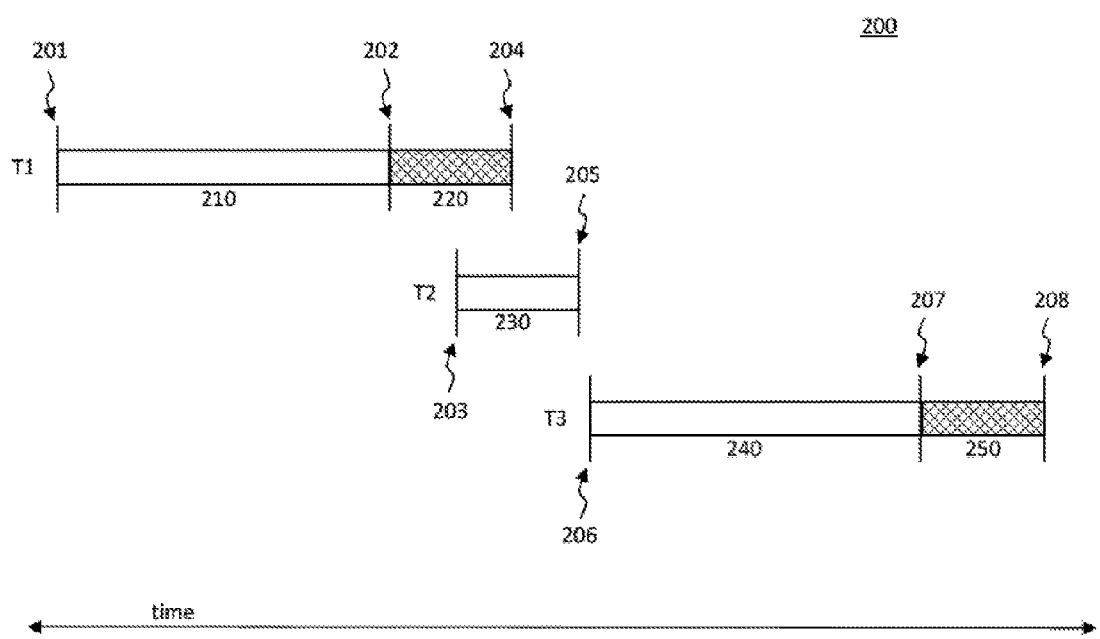
FIG. 2 is a schematic diagram illustrating an example timing diagram for an example transaction system, in accordance with an embodiment.

FIG. 2 is a schematic diagram illustrating an example timing diagram 200 for an example distributed transaction system, in accordance with an embodiment. An example particular transaction T1, performed by a client, such as a client 110, may begin at time 201. During a period 210, one or more tentative write operations may, for example, be performed in which one or more content objects within a database, such as content storage 120, may be written to or otherwise updated. At a point in time 202, client 110 may obtain a timestamp from a transaction manager and may write the timestamp to commit table 140 to commit the particular transaction. During a period 220, client 110 may write to one or more objects affected by the particular transaction with the timestamp. Once or after all objects affected by the particular transaction have the timestamp, the particular transaction is considered complete, such as indicated at time 204 of example timing diagram 200.

In an embodiment, a client may begin to perform an example transaction T2, for example at time 203 depicted in example timing diagram 200, during period 220. As discussed previously, a client, such as a client 111, may obtain a snapshot timestamp from a transaction manager, such as transaction manager 130. In an embodiment, a snapshot timestamp may exceed the timestamps of committed transactions. A client, such as client 111, may also obtain an identifier from a transaction manager, such as transaction manager 130. For the purposes of the example depicted in timing diagram 200, T2 is assumed to involve one or more content objects affected by transaction T1. In an embodiment, if a client performing a transaction encounters no tentative writes, the client may simply return a highest version of one or more of the content objects involved in that transaction. For the example depicted in timing diagram 200, as a client performing transaction T2 performs read operations during time period 230, one or more tentatively-written objects may be encountered by the client as a result of T1 not being complete. At least in part in response to encountering a tentative write, a client, such as second client 111, may check a commit table, such as commit table 140, for committed transactions. In an embodiment, if a tentative write, for example, is determined to be associated with a committed transaction, the tentative writes may be "made complete" by second client 111 with a timestamp for transaction T1. A client may proceed with transaction T2 during time period 230 ending at time 205 and may return highest versions of involved content objects, in an embodiment. As further depicted in example timing diagram 200, a client may commence a subsequent transaction T3 at point in time 206 following completion of transaction T2 at time 205. A client performing transaction T3 may perform one or more write operations that are tentative during time period 240, and may commit the transaction at or after time 207. For example, a timestamp may be obtained and stored in a commit table, such as commit table 140. Likewise, during period 250, tentatively-written objects may be "made complete" with the timestamp, and the transaction T3 may be considered complete at or after time 208, for example.

For the situation described above in connection with FIG. 1 and FIG. 2, utilization of a single transaction manager, such as transaction manager 130, has been discussed. In an embodiment, by relying on a single transaction manager, such as transaction manager 140, with no provisions for other transaction managers, little or no risk is present of a conflict. In an embodiment, for example, a newly generated timestamp may exceed the timestamps for existing committed transactions, such as in accordance with commit table 140, and/or by checking timestamps for a database, such as content storage 120, for example. In embodiments employing no more than a single transaction manager, a transaction manager may be newly generated in response to a failure of a previous transaction manager. Thus, one transaction manager performs committing of transactions, reducing risk of conflict.

In a "failover" situation, however, (e.g., in which a transaction manager has failed, such as for an external reason related to the network) there may be a period of time between a failure of a previous transaction manager and the generation and/or commencement of another transaction manager. This period of time between transaction managers may comprise downtime during which no accesses take place with respect to a database, such as content storage 120. Concerns regarding potential downtime may be addressed, at least in part, by providing strategies for so-called "high-availability" transaction management that may, in an embodiment, provide for more than a single transaction manager to operate in some limited situations.

Figure 3:
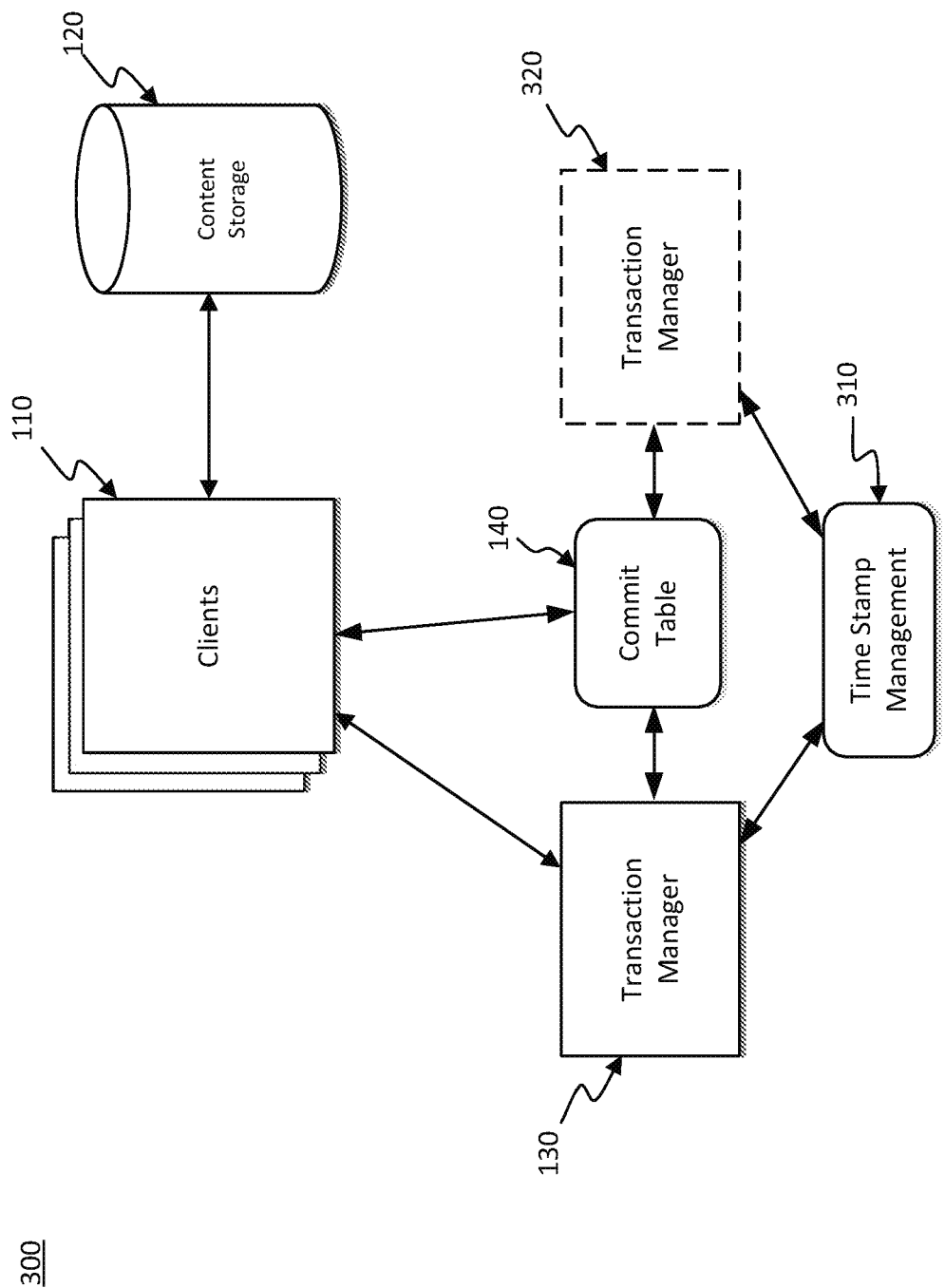
FIG. 3 is a schematic diagram illustrating an example transaction system, in accordance with an embodiment.

FIG. 3 is a schematic diagram illustrating an embodiment 300 of an example distributed transaction system. Example system embodiment 300, for example, may employ processes, procedures and/or approaches to timestamp management to handle situations that may potentially involve more than one transaction manager. Timestamp management may be implemented any one of a variety of ways; however, for convenience, it is depicted pictorially in FIG. 3 using reference numeral 310.

In an embodiment, if a first transaction manager, such as transaction manager 130, fails for whatever reason, another transaction manager, such as transaction manager 320, may be generated. In an embodiment, transactions that began by one or more clients under the direction of a transaction manager that later failed, in which one or more transactions did not reach commit status, such transactions may be deemed aborted. However, if a newly generated (e.g., more recently generated) transaction manager, such as transaction manager 320, begins executing before the previous transaction manager ceases execution, status for pending transactions under direction of the previous transaction manager create the appearance of partial transactions, which would not be consistent with employing atomic transactions. To address potential issues that may arise, a more recently generated transaction manager, such as 320, may obtain a timestamp for a latest committed transaction by the previous transaction manager, such as transaction manager 130. Additionally, in an embodiment, clients that attempted to commit transactions under direction of the previous transaction manager may be notified of a transaction outcome, such as commit and/or abort, for example, according to values stored in a commit table, such as commit table 140. Further, in an embodiment, in the event multiple transaction managers are active concurrently, with respect to a transaction provided a timestamp by a more recently generated transaction manager, transactions with earlier timestamps, e.g., those having a commit or abort status, shall not be altered in status.

A variety of approaches are possible to implement aspects such as described above for multiple transaction manager operation. A possible technique may employ mutual exclusion, in which at most only one transaction manager may commit operations at any given time. For example, a newly generated transaction manager, such as transaction manager 320, may refrain from initiating operation until it is determined that no transactions will be committed by the previous transaction manager. In an embodiment, timestamps for a new transaction manager, such as transaction manager 320, may be allocated, for example, substantially in accordance with timestamp management so as to exceed previous timestamps stored in a commit table, such as commit table 140. Compliance with mutual exclusion techniques may be accomplished, in an embodiment, utilizing lock-type and/or lease-type mechanisms, for example. A disadvantage of mutual-exclusion type techniques for managing and/or coordinating multiple transaction managers may include a performance impact of a lock, for example, for every access of a commit table, such as commit table 140. Thus, all transactions may be affected, and not merely during a failover event.

In another embodiment, an approach may permit multiple transaction managers to serve clients concurrently, such as during a failover situation, until a previous transaction manager, such as transaction manager 130, recognizes the existence and/or operation of a more recently generated transaction manager, such as transaction manager 320. To coordinate transactions managed by different transaction managers, timestamps utilized by a more recently generated transaction manager, such as transaction manager 320, may exceed all of the timestamps assigned by a previous transaction manager, such as transaction manager 130, in an embodiment. Also, in an embodiment, at least in part in response to a client commencing a transaction, such as for example by obtaining a snapshot timestamp, after failover, for example, transactions that may have been assigned a timestamp that is earlier than the snapshot timestamp may not result in further changes to content objects in a database, such as content storage 120. Further, in an embodiment, if a client performing a particular transaction, after failover, encounters a transaction that was initiated but not completed, such as if a tentatively written content object is encountered, the client performing the particular transaction may determine whether to complete the incomplete transaction.

For example, so that timestamps utilized by a more recently generated transaction manager, such as transaction manager 320, exceed timestamps assigned by a prior transaction manager, such as transaction manager 130, and/or so that transactions previously assigned a timestamp that is earlier than a snapshot timestamp more recently assigned do result in further changes to content objects in a database, such as content storage 120, transaction managers, such as transaction manager 130 and transaction manager 320, may substantially in accordance with timestamp management obtain ranges of timestamps allotted from a shared resource, in an embodiment.

Prior to committing a transaction, a transaction manager, such as transaction manager 130, may verify that a timestamp exceeds the range of timestamps allocated to a previous transaction manager, and by doing so also detect existence and/or operation of a more recently generated transaction manager, such as transaction manger 320. At least in part in response to detecting the existence of a more recently generated transaction manager, the particular transaction manager, such as transaction manager 130, may abort a transaction of a client it is attempting to commit and/or may halt operation. Further transactions by clients may then be executed via the more recently generated transaction manager, such as transaction manager 320.

Additionally, in an embodiment, a client may encounter an incomplete transaction, such as a tentatively written content object, that is not marked as committed in a commit table, such as commit table 340. The client that executed the particular transaction that generated the tentatively written content object may be signaled to abort the incomplete transaction, such as by the client that encountered the incomplete transaction. For example, in an embodiment, the client that encountered the incomplete transaction may set an "invalid" field in an entry of a commit table, such as commit table 140, to, in effect, result in the incomplete transaction it encountered being aborted. In an embodiment, if an attempt were made by a client to commit the incomplete transaction, the "invalid" field would be detected, again, resulting in the client aborting the incomplete transaction. Thus, in an embodiment, a client encountering tentatively written content and detecting an invalidity field for a transaction associated with the tentatively written content, as described, will ignore the tentatively written content substantially in accordance with the detected invalidity field.

Figure 4:
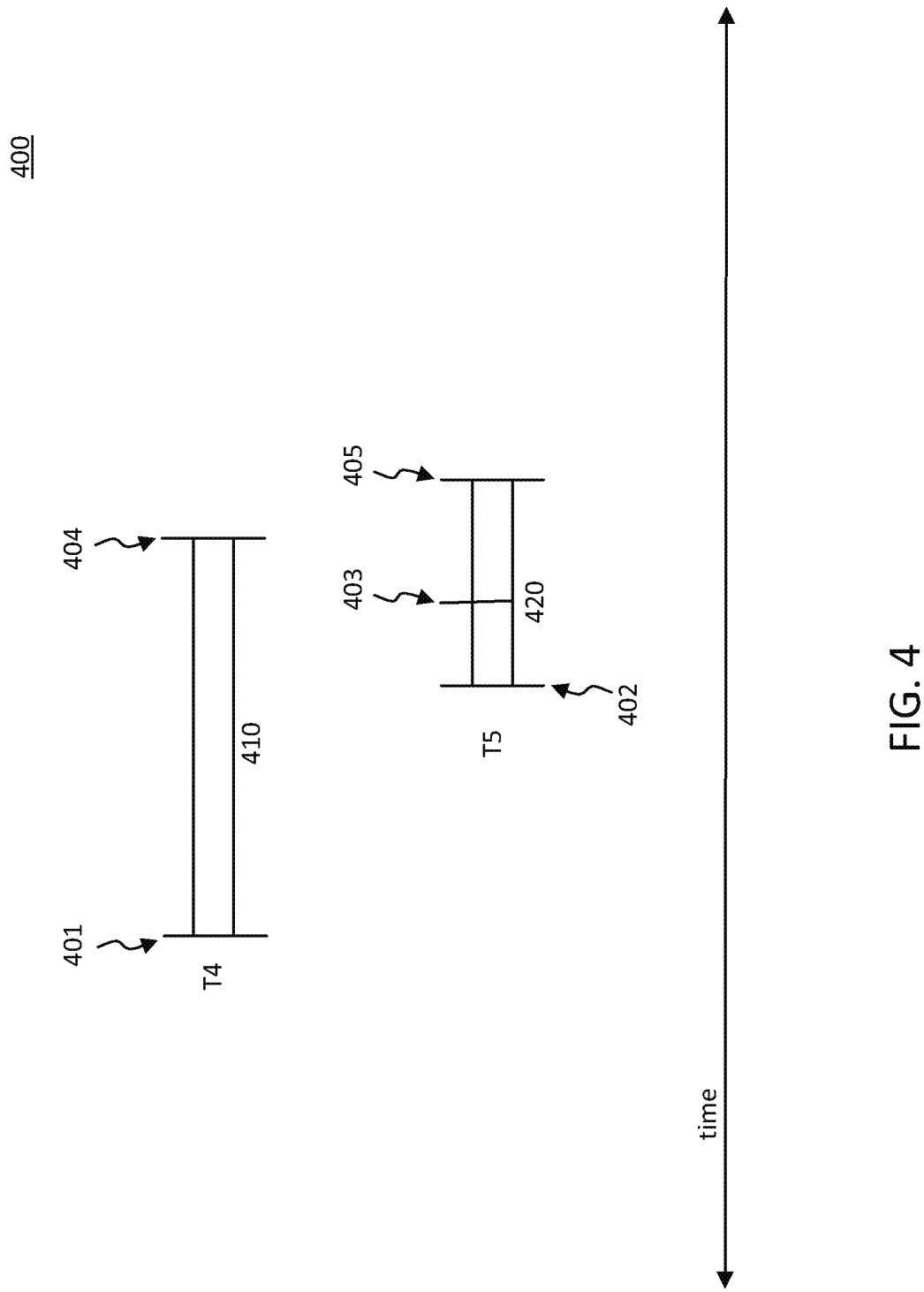
FIG. 4 is a schematic diagram illustrating an example timing diagram for an example transaction system, in accordance with an embodiment.

FIG. 4 is a schematic diagram illustrating an embodiment 400 of an example timing diagram for an example distributed transaction system, such as example distributed transaction system 300 depicted in FIG. 3. In an embodiment, a client may commence an example transaction T4 at time 401 to perform one or more tentative write operations to one or more content objects within a database, such as content storage 120, during a time period 410. Also, in an embodiment, a client may commence an example transaction T5 at time 402. During a time period 420, a client performing transaction T5 may encounter content that has been tentatively written by a client performing transaction T4. A client performing transaction T5 may determine status of a content object at least in part by determining whether transaction T4 has been marked as committed in a commit table, such as commit table 140, for example. At least in part in response to a determination that a content object has been tentatively written by a client executing a previous transaction, and/or at least in part in response to a determination that a previous transaction, such as T4, has not already been invalidated, a client performing transaction T5 may write an "invalid" value to an entry corresponding to transaction T4 in a commit table, such as commit table 140. For example, a client performing transaction T5 may write an "invalid" value to commit table 140 at a time 403, as depicted in example timing diagram 400. Additionally, in an embodiment, an attempt may be made by a client to commit transaction T4 by writing a timestamp to a commit table, such as commit table 140. However, for the example depicted in timing diagram 400, a client performing transaction T4 may detect the "invalid" value and may abort, such as at time 404 depicted in timing diagram 400. A client performing transaction T5 may therefore employ earlier versions of the particular content object that had been tentatively written.

Potential drawbacks of techniques describe above may include overhead and/or negative performance impact due to a relatively very large amount of synchronization operations. As described more fully below, an embodiment may incorporate locally-checkable leases for transaction managers to reduce overhead and/or potential negative performance impact of managing concurrently operating transaction managers.

Figure 5:
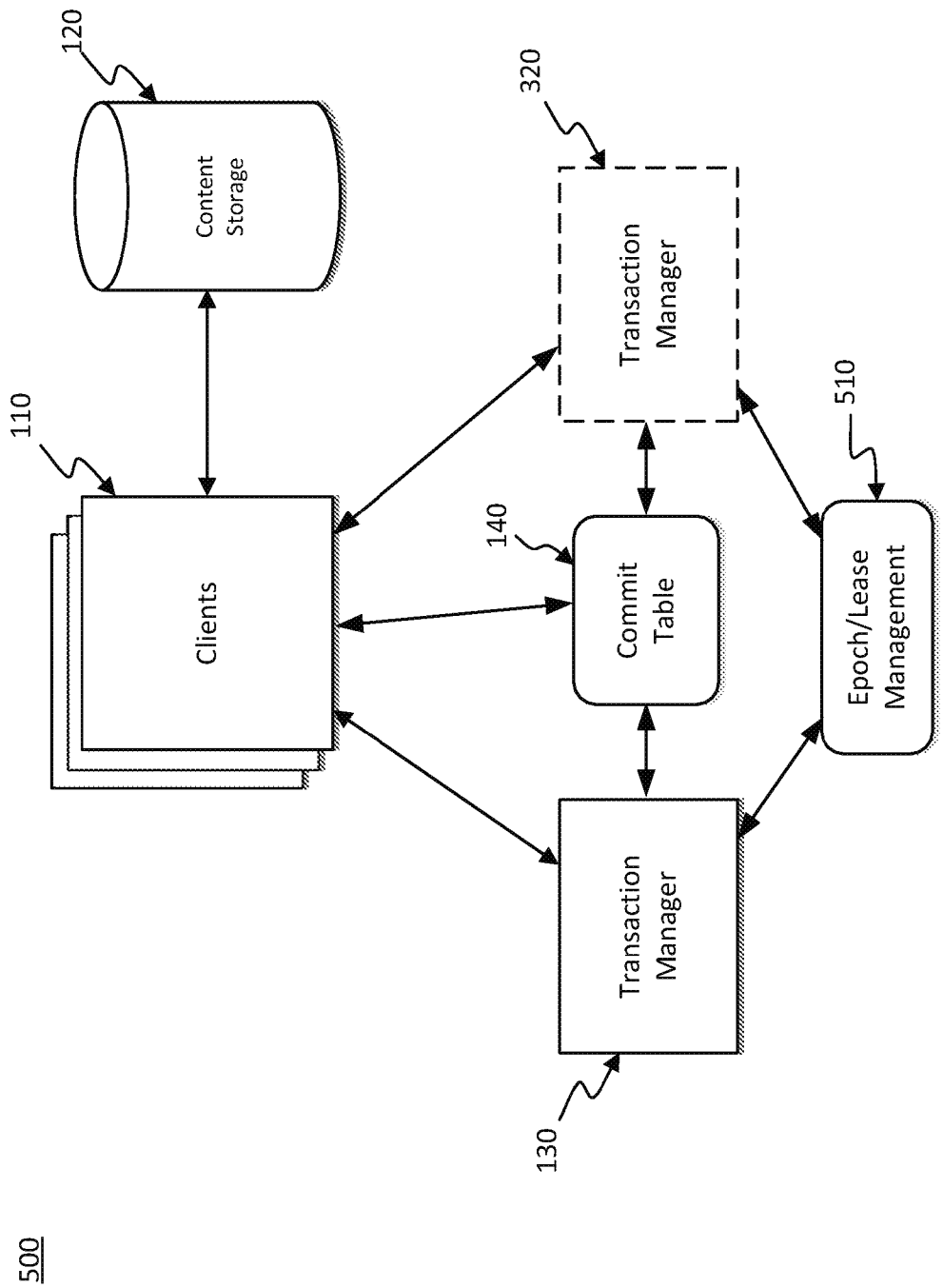
FIG. 5 is a schematic diagram illustrating an example transaction system, in accordance with an embodiment.

FIG. 5 is a schematic diagram illustrating an embodiment 500 of an example distributed transaction system. Example system embodiment 500, for example, may employ processes, procedures and/or approaches to epoch/lease management to handle situations that may potentially involve more than one transaction manager. Epoch/lease management may be implemented in any one of a variety of ways; however, for convenience, it is depicted pictorially in FIG. 5 using reference numeral 510. In an embodiment, for example, a current transaction manager, such as transaction manager 130, may renew a lease periodically. A time period for lease renewal may be specified, in an embodiment, as well as a guard period prior to lease expiration. Also, in an embodiment, one or more ranges of timestamps may be allocated to one or more transaction managers. Although a variety of implementations are possible, a shared resource, such as memory, may be employed.

In an embodiment, timestamps allocated to an earlier transaction manager, such as transaction manager 130, may comprise a range that is different from a range of timestamp values allocated to a later transaction manager, such as transaction manager 320. Further, as used herein, a range of timestamp values may be referred to as an "epoch", although claimed subject matter is not limited in scope in this respect. For example, a range of timestamp values for transaction manager 130 may comprise a different epoch than a range of timestamp values allocated to transaction manager 320, in an embodiment.

In an embodiment, a transaction manager may check lease status prior to providing a client notification to commit a transaction, such as to commit table 140, for example. A transaction manager, for example, may not indicate to a client to commit a transaction during a guard period and/or after lease expiration. As long as a transaction manager, such as transaction manager 130, is able to renew its lease within a specified time period for renewal, however, a transaction manager, such as transaction manager 130, may continue to notify clients regarding being able to commit a transaction. In an embodiment, as a result of a transaction manager, such as transaction manager 130, operating during a period in which a lease remains valid, timestamps from an earlier epoch should not appear in a commit table, for example. In general, a conflict should not arise from a single transaction manager, as previously described. Therefore, epoch/lease management may be employed to appropriately handle a situation, not expected to be a frequent occurrence, in which more than one transaction manager may operate. Such a situation may occur, for example, if a transaction manager were unable to renew its lease, such as from an external and unexpected network issue, for example.

For example, in an embodiment, a situation may arise in which a write by a transaction manager, such as transaction manager 130, to a commit table, such as commit table 140, may overrun a guard period related to lease renewal. In such a situation, a lease for a transaction manager, such as transaction manager 130, may have expired. A transaction manager, such as transaction manager 130, may attempt to commit a transaction after expiration of a lease and/or while a more recently generated transaction manager, such as transaction manager 320, attempts to execute transactions, thereby raising a possibility of content corruption and/or conflict, for example.

In such situations, transaction invalidation, such as that discussed above in connection with FIG. 3, may be performed. However, in an embodiment, as previously indicated, such an approach may be employed to address situations of multiple transaction managers, not a situation involving a single transaction manager. For example, a transaction manager may invalidate another transaction if the latter transaction pertains to an earlier epoch. Additionally, in an embodiment, a client may check whether a transaction has been invalidated at least in part in response to detection of lease expiration for a transaction manager, for example.

In an embodiment, substantially in accordance with epoch/lease management, larger timestamp ranges may be allocated and/or longer lease periods may be specified, thus, as suggested, so that multiple transaction managers operating concurrently may be less likely. Likewise, overhead and/or potential negative performance implications may be reduced.

Figure 6:
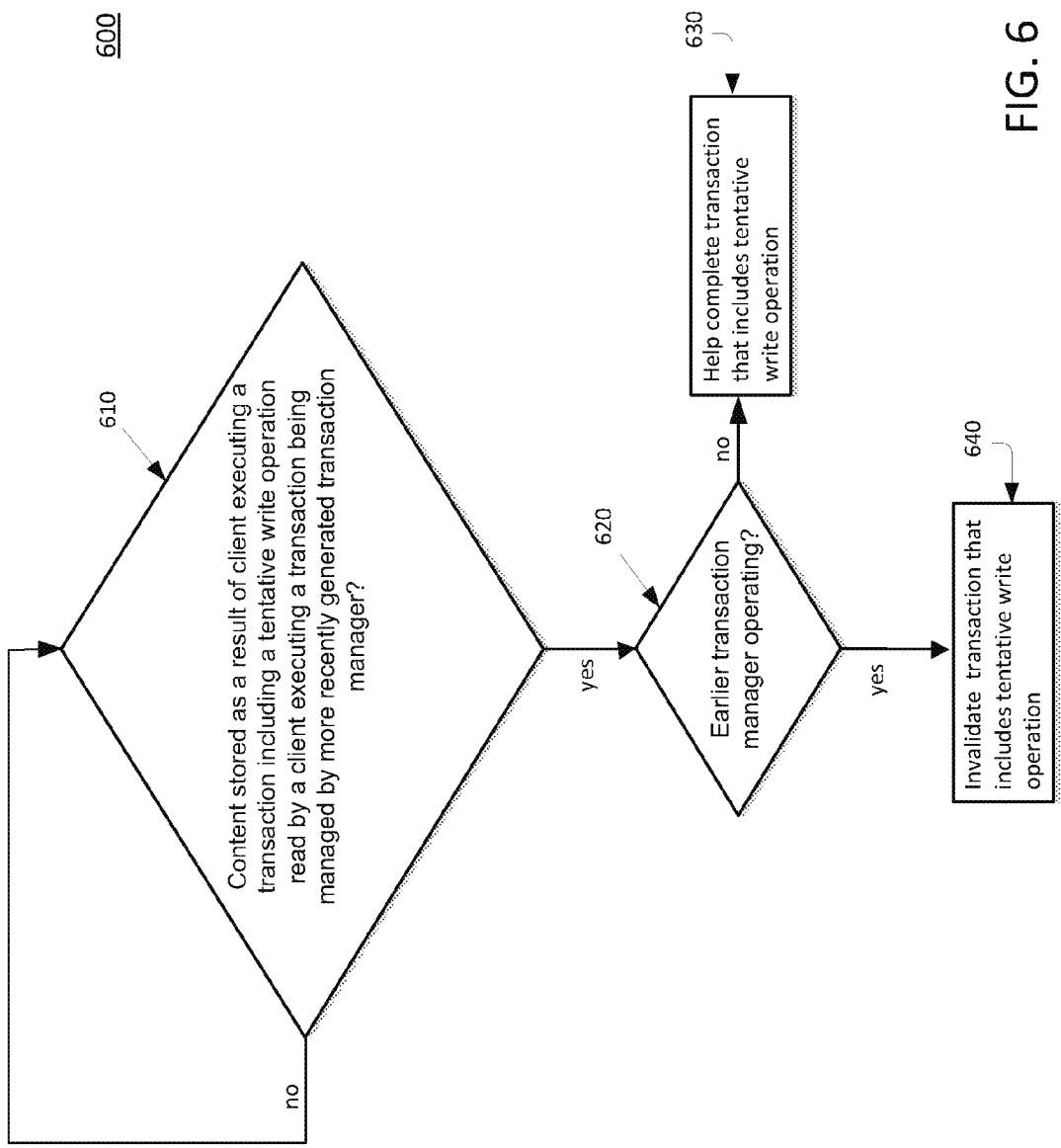
FIG. 6 is a flow diagram illustrating an example process for managing a transaction, in accordance with an embodiment.

FIG. 6 is a flow diagram illustrating an embodiment 600 of an example process for management of a distributed transaction system. Claimed subject matter may include all of blocks 610-640, fewer than blocks 610-640, or more than blocks 610-640. Additionally, the order of blocks 610-640 is merely an example order, and claimed subject matter is not limited in scope in these respects.

As indicated at block 610, a determination may be made as to whether content, stored as a result of a client executing a transaction including a tentative write operation, may be targeted by a client executing a transaction including a read operation managed by a more recently generated (e.g., later) transaction manager, such as transaction manager 320. As used herein, the terms "target" and/or "targeted" are used with respect to content access operations executed by a client performing a particular transaction. For example, a client executing a transaction may target a content object in a database, such as content storage 120, at least in part by executing an operation that writes to the content object or by executing an operation that reads the content object. At block 620, at least in part in response to a determination that content stored as a result of client performing a transaction that includes a tentative write operation may be targeted by client performing a particular transaction that includes execution of a read operation in which the particular transaction is managed by a more recently generated transaction manager, a determination may be made as to whether a previous (e.g., earlier) transaction manager, such as transaction manager 130, is operating. In an embodiment, a client executing the particular transaction may help complete the transaction that included the tentative write operation at least in part in response to a determination that an earlier transaction manager, such as transaction manager 130, responsible for the incomplete transaction, has ceased operating, as indicated, for example, at block 630. Additionally, in an embodiment, a client executing the particular transaction may invalidate the transaction that included the tentatively written content at least in part in response to a determination that the earlier transaction manager, such as transaction manager 130, has not ceased operating, such as indicated, for example, at block 640.

Figure 7:
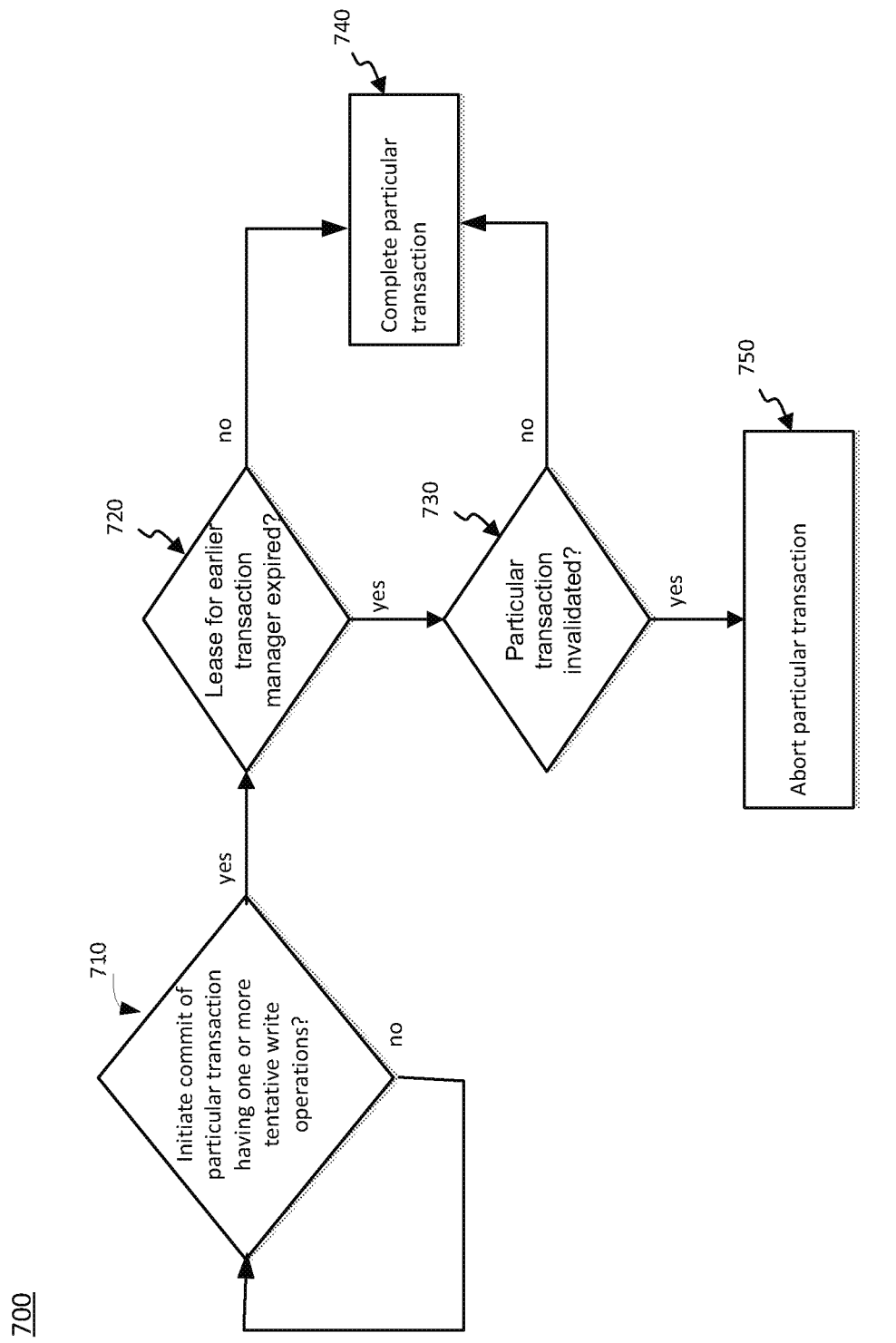
FIG. 7 is a flow diagram illustrating an example process for managing a transaction, in accordance with an embodiment.

FIG. 7 is a flow diagram illustrating an example embodiment 700 of an example process for managing a transaction. Claimed subject matter may include all of blocks 710-750, fewer than blocks 710-750, or more than blocks 710-750. Additionally, the order of blocks 710-750 is merely an example order, and claimed subject matter is not limited in scope in these respects.

As indicated at block 710, an initiation by a client to commit a transaction that includes one or more tentative write operations may be detected. At least in part in response, at block 720, a determination may be made by a client and/or by a server computing device as to whether a lease for an earlier transaction manager, such as transaction manager 130, for example, has expired. At least in part in response to a determination that the lease has not expired, the particular transaction that included one or more tentative write operations may be completed by the client, as indicated at block 740. Also, in an embodiment, at least in part in response to a determination that a lease for an earlier transaction manager, such as transaction manager 130, has expired, a determination may be made as to whether the particular transaction by the client that included the one or more tentative write operations has been previously invalidated, as indicated at block 730, for example. At least in part in response to a determination that the particular transaction by the client that includes the one or more tentative writes has not been invalidated previously, the particular transaction of that client may be completed, as indicated at block 740. Further, in an embodiment, the particular transaction of that client may be aborted, as indicated at block 750, for example, at least in part in response to a determination that the particular transaction had been previously invalidated.

Figure 8:
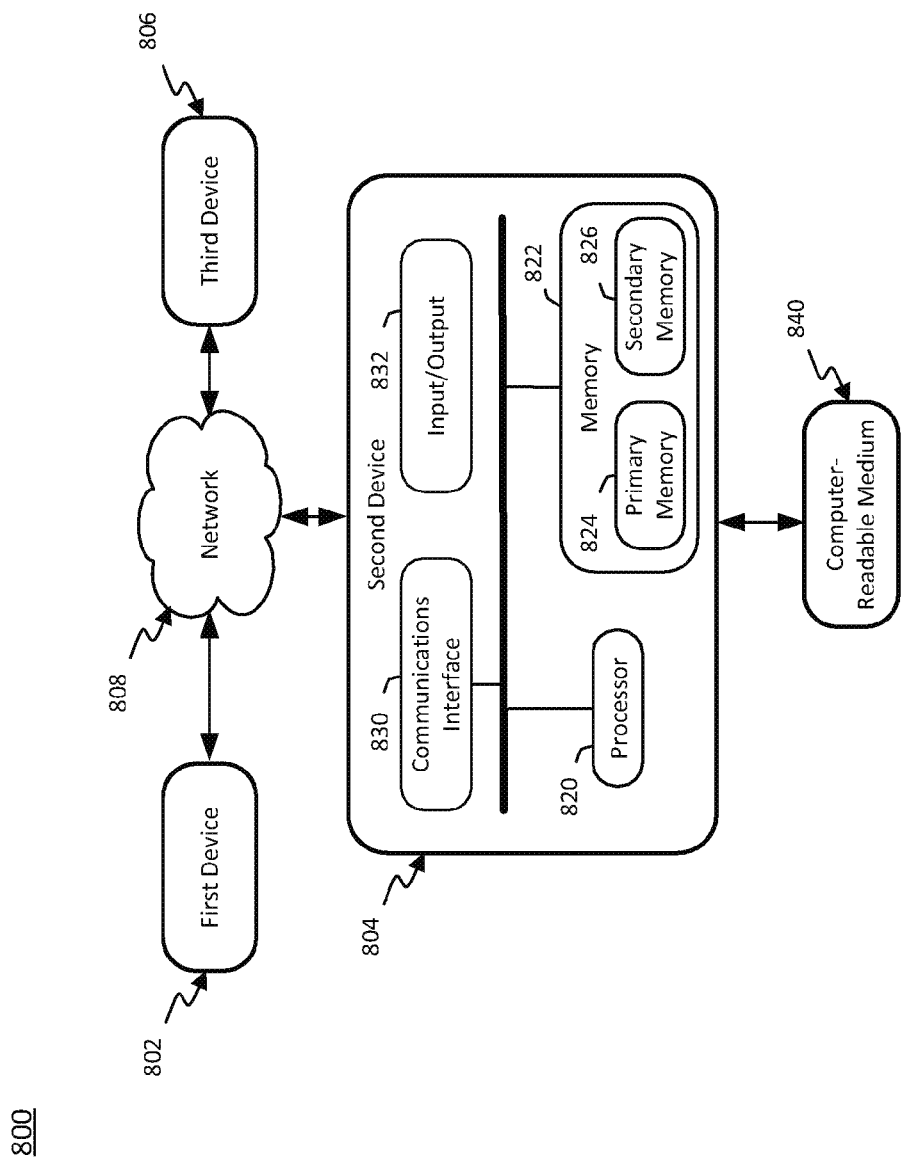
FIG. 8 is a schematic diagram illustrating an example computing device in accordance with an embodiment.

For purposes of illustration, FIG. 8 is an illustration of an embodiment of a system 800 that may be employed in a client-server type interaction, such as described infra. In connection with rendering a GUI via a device, such as a network device and/or a computing device, for example. In FIG. 8, computing device 802 ('first device' in figure) may interface with client 804 ('second device' in figure), which may comprise features of a client computing device, for example. Communications interface 830, processor (e.g., processing unit) 820, and memory 822, which may comprise primary memory 824 and secondary memory 826, may communicate by way of a communication bus, for example. In FIG. 8, client computing device 802 may represent one or more sources of analog, uncompressed digital, lossless compressed digital, and/or lossy compressed digital formats for content of various types, such as video, imaging, text, audio, etc. in the form physical states and/or signals, for example. Client computing device 802 may communicate with computing device 804 by way of a connection, such as an internet connection, via network 808, for example. Although computing device 804 of FIG. 8 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 820 may be representative of one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In implementations, processor 820 may perform signal processing to manipulate signals and/or states, to construct signals and/or states, etc., for example.

Memory 822 may be representative of any storage mechanism. Memory 820 may comprise, for example, primary memory 822 and secondary memory 826, additional memory circuits, mechanisms, or combinations thereof may be used. Memory 820 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 820 may be utilized to store a program. Memory 820 may also comprise a memory controller for accessing computer readable-medium 840 that may carry and/or make accessible content, which may include code, and/or instructions, for example, executable by processor 820 and/or some other unit, such as a controller and/or processor, capable of executing instructions, for example.

Under direction of processor 820, memory, such as memory cells storing physical states, representing, for example, a program, may be executed by processor 820 and generated signals may be transmitted via the Internet, for example. Processor 820 may also receive digitally-encoded signals from client computing device 802.

Network 808 may comprise one or more network communication links, processes, services, applications and/or resources to support exchanging communication signals between a client computing device, such as 802, and computing device 806 ('third device' in figure), which may, for example, comprise one or more servers (not shown). By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 804, as depicted in FIG. 8, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 822 may store cookies relating to one or more users and may also comprise a computer-readable medium that may carry and/or make accessible content, including code and/or instructions, for example, executable by processor 820 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be substantially compliant and/or substantially compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method of executing computer instructions on at least one computing device in which the at least one computing device includes at least one processor and at least one memory, comprising:
   fetching computer instructions from the at least one memory of the at least one computing device for execution on the at least one processor of the at least one computing device;
   executing the fetched computer instructions on the at least one processor of the at least one computing device; and
   storing in the at least one memory of the at least one computing device any results of having executed the fetched computer instructions on the at least one processor of the at least one computing device;
   the computer instructions to be executed comprising instructions for operating a transaction manager as an intermediary between a transaction database and one or more clients for a distributed transaction system; and
   executing the fetched transaction manager operating instructions further comprises:
      before authorizing a particular client that is requesting to commit a particular transaction, verifying that a lease for the transaction manager has not expired; and
      authorizing the particular client at least in part by writing a timestamp to a commit table stored in a shared memory at least in part in response to a determination that the lease for the transaction manager has expired and has not renewed within a specified time period and at least in part in response to a determination that a particular transaction including one or more tentative write operations has not been invalidated.

2. The method of claim 1, further comprising, at least in part in response to a determination that the lease of the transaction manager has expired and has not renewed within the specified time period, verifying that another transaction manager is operating and halting operation of the transaction manager.

3. The method of claim 1, further comprising, at least in part in response to a determination that the lease of the transaction manager has expired and has not renewed within the specified time period, employing another epoch of timestamps with another transaction manager.

4. The method of claim 1, wherein the authorizing the particular client further comprises, at least in part in response to a determination that the lease of the transaction manager has expired and has not renewed within the specified time period and at least in part in response to a determination that the particular transaction includes the one or more tentative write operations, determining whether the particular transaction has been invalidated.

5. The method of claim 4, wherein the determining whether the particular transaction has been invalidated comprises determining whether an invalid field in an entry of the commit table has been set by another client executing another particular transaction managed by another transaction manager.

6. The method of claim 1, wherein the authorizing the particular client to commit the particular transaction comprises authorizing the particular client without determining whether the particular transaction has been invalidated.

7. An apparatus, comprising:
at least one computing device;
the at least one computing device to include at least one processor and at least one memory;
the at least one computing device to execute computer instructions on at least one processor without further human interaction;
the computer instructions to be executed to have been fetched from the at least one memory for execution on the at least one processor, and the at least one computing device to store in the at least one memory of the at least one computing device any results to be generated from the execution on the at least one processor of the to be executed computer instructions;
the computer instructions to be executed to comprise instructions to operate a transaction manager as an intermediary between a transaction database and one or more clients for a distributed transaction system;
the transaction manager operating instructions to be executed to:
verify that a lease for the transaction manager has not expired at least in part in response to a request from a particular client to commit a particular transaction; and
authorize the particular client to commit the particular transaction at least in part in response to a determination that the lease for the transaction manager has expired and has not renewed within a specified time period and at least in part in response to a determination that the particular transaction to include one or more tentative write operations has not been invalidated, wherein to authorize the particular client to comprise to write a timestamp to a commit table to be stored in a shared memory.

8. The apparatus of claim 7, wherein the instructions to be executed further to, at least in part in response to a determination that the lease of the transaction manager has expired and has not renewed within the specified time period, verify current operation of another transaction manager and halt operation of the transaction manager.

9. The apparatus of claim 7, wherein the instructions to be executed further to, at least in part in response to a determination that the lease of the transaction manager has expired and has not renewed within the specified time period, employ another epoch of timestamps with another transaction manager.

10. The apparatus of claim 7, wherein the particular transaction to include one or more tentative write operations, and wherein the instructions to be executed further to, at least in part in response to a determination that the lease of the transaction manager has expired and has not renewed within the specified time period, determine whether the particular transaction has been invalidated.

11. The apparatus of claim 10, wherein, to determine whether the particular transaction has been invalidated, the instructions to be executed further to determine whether an invalid field in an entry of the commit table has been set by another particular client to execute another particular transaction to be managed by another transaction manager.

12. The apparatus of claim 7, wherein, to authorize the particular client to commit the particular transaction, the instructions to be executed further to authorize the particular client and to not determine whether the particular transaction has been invalidated.

13. An apparatus, comprising:
means for executing computer instructions on at least one computing device in which the at least one computing device includes at least one processor and at least one memory, comprising:
means for fetching computer instructions from the at least one memory of the at least one computing device for execution on the at least one processor of the at least one computing device;
means for executing the fetched computer instructions on the at least one processor of the at least one computing device; and
means for storing in the at least one memory of the at least one computing device any results of having executed the fetched computer instructions on the at least one processor of the at least one computing device;
the computer instructions to be executed comprising instructions for operating the at least one computing device at least in part as a client computing device of a distributed content transaction system; and
the means for executing the fetched distributed content transaction system instructions further comprises:
means for initiating a particular transaction including one or more read operations targeted to one or more content objects having been tentatively written to a content store of the distributed content transaction system;
means for determining whether the one or more content objects were tentatively written to the content store by another client computing device executing another particular transaction during a period having a particular transaction manager whose lease has since expired and not been renewed within a specified time period, including means for determining whether a timestamp for the another particular transaction stored in a commit table in a shared content store of the distributed content transaction system falls within a particular range of timestamp values allocated for the particular transaction manager whose lease has since expired and not been renewed within the specified time period; and
means for invalidating the another particular transaction at least in part in response to a determination that the one or more content objects were tentatively written to the content store by the another client computing device executing the another particular transaction during the period having the particular transaction manager whose lease has since expired and not been renewed within the specified time period.

14. The apparatus of claim 13, wherein the means for executing the fetched instructions further comprises: means for completing one or more write operations for the content objects having been tentatively written to the content store at least in part in response to a determination that the one or more content objects were not tentatively written to the content store by the another client computing device executing the another particular transaction during the period having the particular transaction manager whose lease has since expired and not been renewed within the specified time period.

15. The client computing device of claim 13, wherein the particular range of timestamp values allocated for the particular transaction manager whose lease has since expired and not been renewed within the specified time period differs from a particular range of timestamp values allocated for another particular transaction manager.

16. The apparatus of claim 14, wherein the means for completing the one or more write operations for the content objects having tentatively been written to the content store comprises:
- means for obtaining a timestamp for the another particular transaction from an entry of the commit table for the distributed content transaction system corresponding to the another particular transaction; and
- means for writing the timestamp for the another particular transaction to the one or more content objects.

* * * * *